United States Patent
Inukai et al.

(10) Patent No.: US 8,069,009 B2
(45) Date of Patent: Nov. 29, 2011

(54) PHYSICAL QUANTITY DETECTION CIRCUIT AND PHYSICAL QUANTITY SENSOR DEVICE

(75) Inventors: Fumihito Inukai, Kyoto (JP); Seiichi Muroya, Osaka (JP); Yoichi Kaino, Osaka (JP)

(73) Assignee: Panasonic Corporation, Osaka (JP)

( * ) Notice: Subject to any disclaimer, the term of this patent is extended or adjusted under 35 U.S.C. 154(b) by 50 days.

(21) Appl. No.: 12/618,055

(22) Filed: Nov. 13, 2009

(65) Prior Publication Data
US 2010/0057384 A1    Mar. 4, 2010

Related U.S. Application Data

(63) Continuation of application No. PCT/JP2009/000305, filed on Jan. 27, 2009.

(30) Foreign Application Priority Data

Apr. 4, 2008  (JP) ................. 2008-098694

(51) Int. Cl.
*G04F 5/14* (2006.01)
*G04F 3/06* (2006.01)
*G06F 3/05* (2006.01)
*G06F 13/20* (2006.01)

(52) U.S. Cl. ......... 702/176; 702/177; 702/183; 702/188
(58) Field of Classification Search .............. 702/54, 702/77, 104, 116, 160, 176, 179, 183, 184, 702/189; 324/661; 356/460
See application file for complete search history.

(56) References Cited

U.S. PATENT DOCUMENTS

| | | | |
|---|---|---|---|
| 5,080,489 A | 1/1992 | Nishikawa et al. | |
| 5,264,914 A * | 11/1993 | Oho et al. | 356/460 |
| 5,812,427 A * | 9/1998 | Nonoyama et al. | 702/141 |
| 6,082,196 A | 7/2000 | Nonoyama et al. | |
| 6,276,204 B1 | 8/2001 | Townsend | |
| 6,483,322 B2 * | 11/2002 | Aoyama et al. | 324/661 |
| 2008/0049108 A1 | 2/2008 | Ebato | |
| 2010/0066423 A1* | 3/2010 | Inukai et al. | 327/163 |
| 2010/0169028 A1* | 7/2010 | Shiraki et al. | 702/56 |

(Continued)

FOREIGN PATENT DOCUMENTS

JP    07-146151    6/1995

(Continued)

OTHER PUBLICATIONS

Japanese Notice of Reasons for Rejection, w/ English translation thereof, issued in Japanese Patent Application No. JP 2008-098694 dated Feb. 8, 2011.

*Primary Examiner* — Hal Wachsman
*Assistant Examiner* — Felix Suarez
(74) *Attorney, Agent, or Firm* — McDermott Will & Emery LLP

(57) ABSTRACT

A physical quantity detection circuit (12) is used for a physical quantity sensor (10) that outputs a sensor signal according to a physical quantity given externally. A sampling phase adjustment circuit (100) adjusts the phase of a sampling clock (CKa). An analog-to-digital converter circuit (104) converts the sensor signal (Ssnc) to a digital sensor signal (Dsnc) in synchronization with the sampling clock (CKsp) phase-adjusted by the sampling phase adjustment circuit. A detection circuit (107) detects the physical quantity based on the digital sensor signal (Dsnc) from the analog-to-digital converter circuit.

12 Claims, 17 Drawing Sheets

U.S. PATENT DOCUMENTS

| | | | |
|---|---|---|---|
| 2010/0237909 A1* | 9/2010 | Inukai et al. | 327/108 |
| 2010/0289480 A1* | 11/2010 | Soramoto et al. | 324/85 |
| 2011/0179868 A1* | 7/2011 | Kaino et al. | 73/504.12 |

FOREIGN PATENT DOCUMENTS

| | | |
|---|---|---|
| JP | 7-146151 | 6/1995 |
| JP | 7-198394 | 8/1995 |
| JP | 8-14916 | 1/1996 |
| JP | 08-014916 | 1/1996 |
| JP | 2728300 | 12/1997 |
| JP | 2003-042768 | 2/2003 |
| JP | 2004-212111 | 7/2004 |
| JP | 2004-239907 | 8/2004 |
| JP | 2006-329637 | 12/2006 |
| JP | 2007-292660 | 11/2007 |
| JP | 2008-52175 | 3/2008 |

\* cited by examiner

PHYSICAL QUANTITY DETECTION CIRCUIT AND PHYSICAL QUANTITY SENSOR DEVICE

CROSS-REFERENCE TO RELATED APPLICATIONS

This is a continuation of PCT International Application PCT/JP2009/000305 filed on Jan. 27, 2009, which claims priority to Japanese Patent Application No. 2008-098694 filed on Apr. 4, 2008. The disclosures of these applications including the specifications, the drawings, and the claims are hereby incorporated by reference in its entirety.

BACKGROUND OF THE INVENTION

The technique disclosed herein relates to a physical quantity detection circuit used for a physical quantity sensor that detects a physical quantity given externally and to a physical quantity sensor device provided with the same, and more particularly, to a technique of adjusting the phase relationship between a sensor signal and a detection signal.

Conventionally, physical quantity sensor devices capable of detecting a physical quantity (e.g., an angular velocity, an acceleration, etc.) are used in a variety of technical fields such as detection of shake of a digital camera, attitude control of a mobile unit (e.g., an aircraft, an automobile, a robot, a vessel, etc.), and guidance of a missile and a spacecraft. In general, a physical quantity sensor device includes: a physical quantity sensor that outputs a sensor signal according to a physical quantity given externally; and a physical quantity detection circuit that detects a physical quantity signal (signal corresponding to the physical quantity) from the sensor signal using a detection signal (signal having a frequency corresponding to the frequency of the sensor signal).

In recent years, with the progress of the circuit nanotechnology, more and more physical quantity detection circuits are being implemented using digital circuits. Japanese Patent Gazette No. 2728300 (Patent Document 1) discloses a signal processing circuit for a biaxial angular velocity/acceleration sensor, which is composed of digital circuits. In this signal processing circuit, while an analog-to-digital converter circuit converts a sensor signal from the sensor to a digital sensor signal, a sine wave signal generation circuit generates a digital sine wave signal, and a digital multiplier circuit multiplies the digital sensor signal by the digital sine wave signal. For example, as shown in FIG. 17, the analog-to-digital converter circuit samples a sensor signal in synchronization with a sampling clock (i.e., every sampling period) and converts sampled analog values (amplitude values) A0, A1, A2, . . . of the sensor signal to digital values P0, P1, P2, . . . .

In a physical quantity detection circuit, whether it is an analog circuit or a digital circuit, it is important to adjust the phase relationship between a sensor signal and a detection signal so that these signals can be synchronous with each other. Such a phase adjustment technique is disclosed in Japanese Laid-Open Patent Publication No. 8-14916 (Patent Document 2). A vibration gyro disclosed in Patent Document 2 is provided with a phase correction circuit including a temperature-sensitive element (element having a predetermined temperature characteristic), to correct a phase shift of the detection signal caused by a temperature change.

SUMMARY

However, in the signal processing circuit disclosed in Patent Document 1, for correct processing of the data (digital values) from the analog-to-digital converter circuit, it is necessary to adjust the phase relationship between the digital sensor signal and the digital sine wave signal in data units of the digital sensor signal. In other words, the resolution (minimum unit) for the phase adjustment cannot be made smaller than the sampling period of the analog-to-digital converter circuit. Therefore, to improve the precision of the phase adjustment, the sampling frequency of the analog-to-digital converter circuit must be increased. However, a higher sampling frequency will increase the circuit scale and the power consumption.

In view of the above, an object of the technique disclosed herein is improving the precision of the phase adjustment while suppressing increase in sampling frequency.

According to one aspect of the present invention, the physical quantity detection circuit is a physical quantity detection circuit used for a physical quantity sensor that outputs a sensor signal according to a physical quantity given externally, the circuit including: a sampling phase adjustment circuit configured to adjust the phase of a sampling clock having a predetermined sampling frequency; an analog-to-digital converter circuit configured to convert the sensor signal to a digital sensor signal in synchronization with the sampling clock phase-adjusted by the sampling phase adjustment circuit; and a is detection circuit configured to detect the physical quantity based on the digital sensor signal from the analog-to-digital converter circuit. In this physical quantity detection circuit, by adjusting the phase of the sampling clock, the sampling points (positions of transition edges of the sampling clock) can be shifted, and as a result, the phase of the digital sensor signal can be changed. Hence, it is possible to improve the precision of the phase adjustment while suppressing increase in sampling frequency.

Preferably, the sampling phase adjustment circuit described above operates in synchronization with a multiplied clock having a frequency higher than the sampling frequency, to delay the sampling clock by a predetermined number of pulses of the multiplied clock. In this physical quantity detection circuit, the phase of the sampling clock can be set using the period of the multiplied clock as the unit. As the frequency of the multiplied clock is higher, the phase of the sampling clock can be set more precisely. Hence, the phase of the digital sensor signal can be adjusted precisely.

The sampling phase adjustment circuit described above may include: a shift register configured to shift the sampling clock sequentially in synchronization with the multiplied clock to generate a plurality of delayed clocks; and a selector configured to select one of the plurality of delayed clocks generated by the shift register. The analog-to-digital converter circuit may perform analog-to-digital conversion in synchronization with the delayed clock selected by the selector. With this configuration, the sampling clock can be delayed by a predetermined number of pulses of the multiplied clock.

The sampling phase adjustment circuit described above may include: a sampling phase adjustment counter configured to count the number of generated pulses of the multiplied clock to generate a timing signal once the number of generated pulses reaches a predetermined value; and a clock generation circuit configured to generate the sampling clock in response to a transition edge of the timing signal from the sampling phase adjustment counter. With this configuration, the sampling clock can be delayed by a predetermined number of pulses of the multiplied clock.

According to another aspect of the present invention, the physical quantity detection method is a method for detecting a physical quantity based on a sensor signal from a physical quantity sensor that senses a physical quantity given externally, including the steps of: adjusting the phase of a sampling clock having a predetermined sampling frequency; converting the sensor signal to a digital sensor signal in synchronization with the phase-adjusted sampling clock; and detecting the physical quantity based on the digital sensor signal. In this physical quantity detection method, by adjusting the phase of the sampling clock, the sampling points can be shifted, and as a result, the phase of the digital sensor signal can be changed. Hence, it is possible to improve the precision of the phase adjustment while suppressing increase in sampling frequency.

DESCRIPTION OF THE PREFERRED EMBODIMENTS

Figure 1:
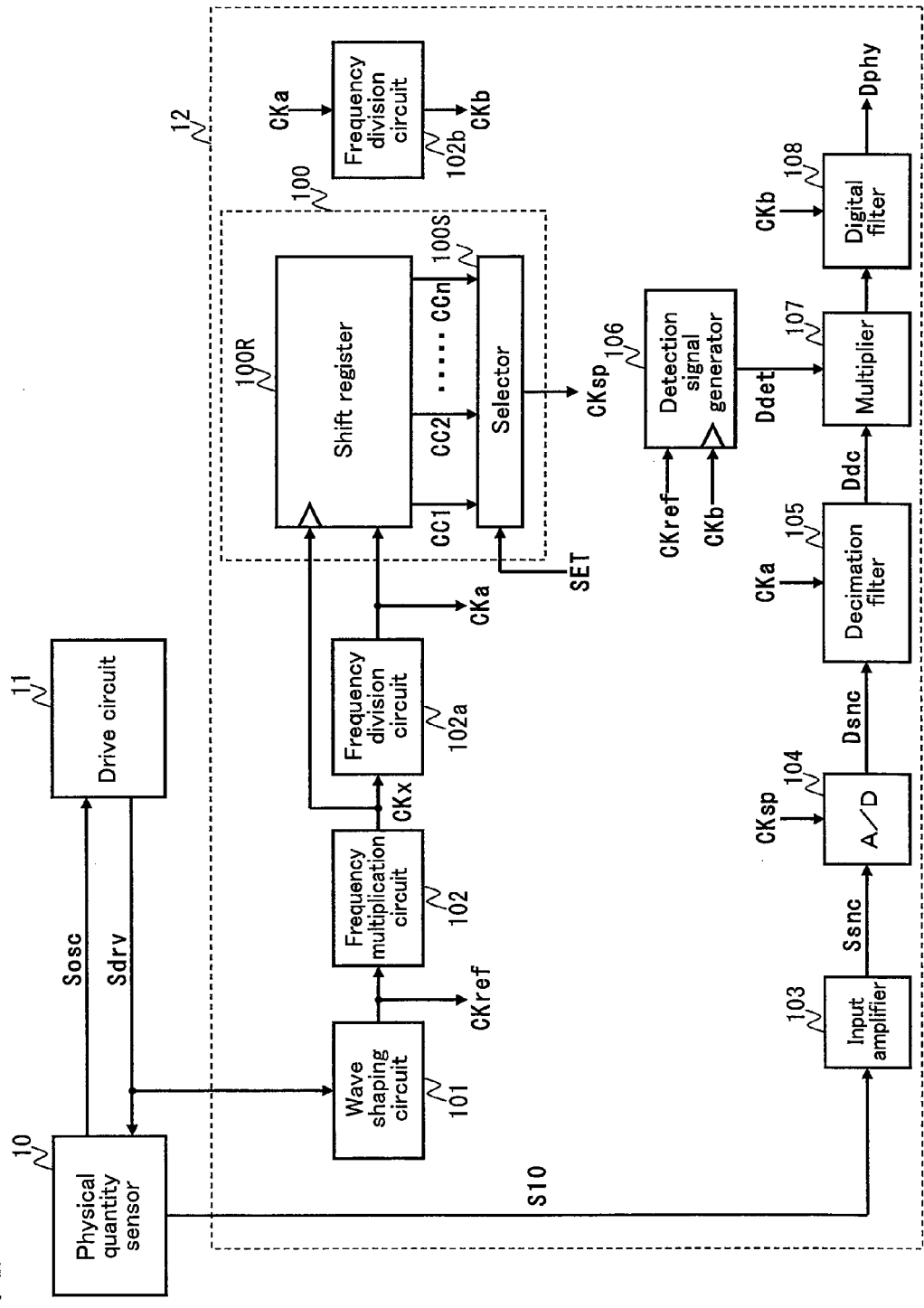
FIG. 1 is a view showing an example configuration of a physical quantity sensor device of Embodiment 1.

Preferred embodiments will be described in detail hereinafter with reference to the accompanying drawings. It should be noted that identical or equivalent components are denoted by the same reference characters throughout the drawings, and no repeated description will be made on such components.

Embodiment 1

FIG. 1 shows an example configuration of a physical quantity sensor device of Embodiment 1. The physical quantity sensor device includes a physical quantity sensor 10, a drive circuit 11, and a physical quantity detection circuit 12. The physical quantity sensor 10 receives a drive signal Sdrv having a predetermined frequency from the drive circuit 11, and outputs a sensor signal S10 according to a physical quantity (e.g., an angular velocity, an acceleration, etc.) given externally. The frequency of the sensor signal S10 corresponds to the frequency of the drive signal Sdrv. For example, the center frequency (carrier frequency) of the sensor signal S10 is equal to the frequency of the drive signal Sdrv. Assume in this embodiment that the physical quantity sensor 10 is a tuning fork type angular velocity sensor. The drive circuit 11 supplies the drive signal Sdrv to the physical quantity sensor 10. Also, the drive circuit 11 adjusts the frequency and amplitude of the drive signal Sdrv according to an oscillation signal Sosc from the physical quantity sensor 10. The physical quantity detection circuit 12 detects the physical quantity based on the sensor signal S10 from the physical quantity sensor 10.

[Physical Quantity Sensor]

Figure 2:
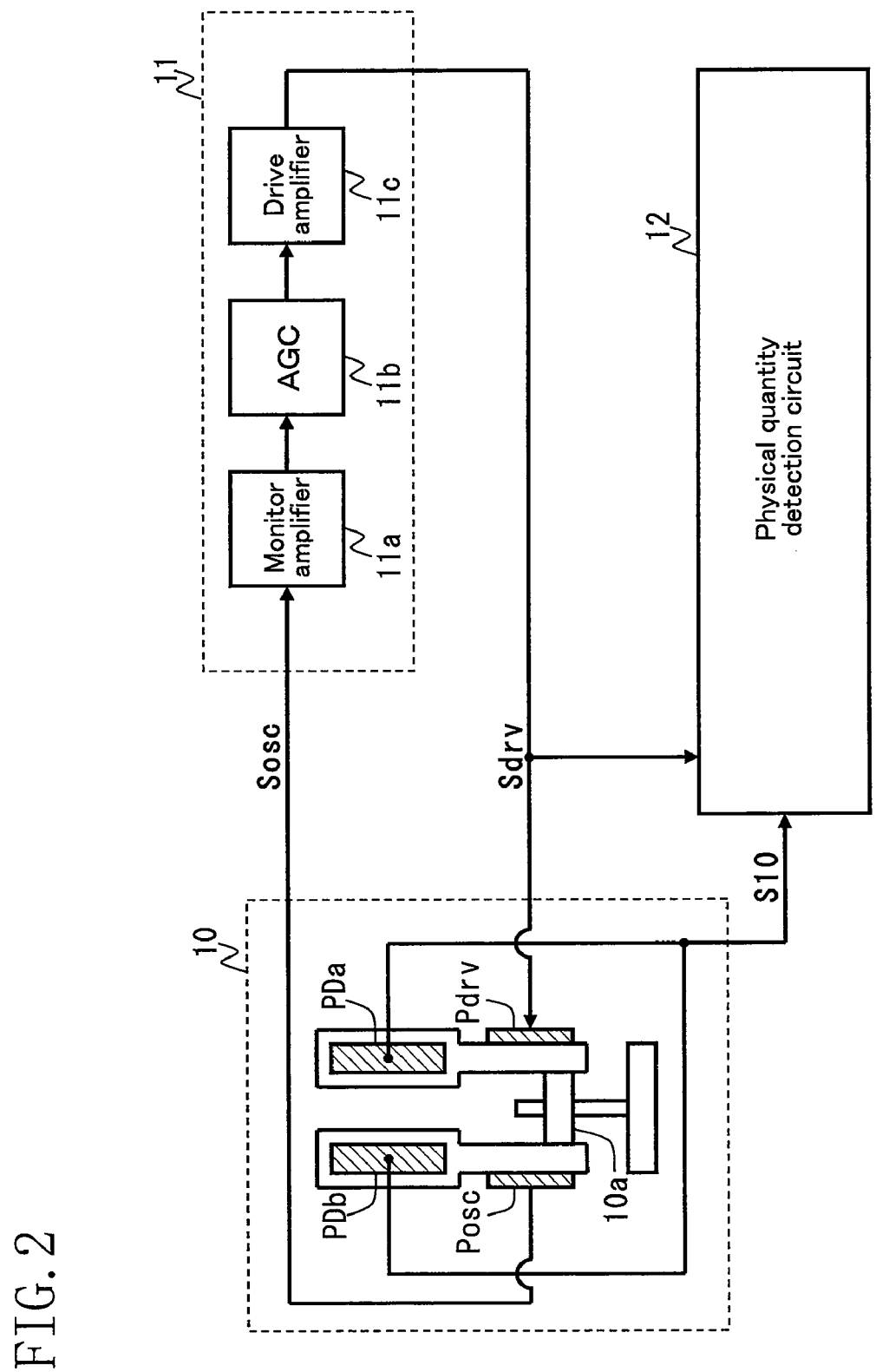
FIG. 2 is a view showing an example configuration of a physical quantity sensor and a drive circuit shown in FIG. 1.

As shown in FIG. 2, the physical quantity sensor 10 includes a tuning fork body 10a, a drive piezoelectric element Pdrv, an oscillation detection piezoelectric element Posc, and angular velocity detection piezoelectric elements PDa and PDb. The tuning fork body 10a has two prongs each twisted by the right angle in the center, a connection for connecting the two prongs at their ends on one side, and a support pin provided at the connection to serve as a rotation axis. The drive piezoelectric element Pdrv oscillates one prong according to the frequency and amplitude of the drive signal Sdrv supplied from the drive circuit 11, causing resonance of the two prongs. With this oscillation of the tuning fork, charge is generated in the oscillation detection piezoelectric element Posc (i.e., an oscillation signal Sosc is generated). Also, once a rotational angular velocity occurs, an amount of charge responsive to the rotational angular velocity (Coriolis force) is generated in the angular velocity detection piezoelectric elements PDa and PDb (i.e., the sensor signal S10 is generated).

[Drive Circuit]

In the drive circuit 11, a monitor amplifier 11a converts the oscillation signal Sosc from the physical quantity sensor 10 to a voltage. An automatic gain control amplifier (AGC) 11b amplifies or attenuates the output of the monitor amplifier 11a, changing its amplification gain so that the voltage supplied to a drive amplifier 11c is kept constant. The drive amplifier 11c controls the frequency and amplitude of the drive signal Sdrv according to the output of the AGC 11b. In this way, with the adjustment of the drive signal Sdrv according to the oscillation signal Sosc, the maximum oscillation amplitude and oscillation frequency of the physical quantity sensor 10 are kept constant.

[Physical Quantity Detection Circuit]

Referring back to FIG. 1, the physical quantity detection circuit 12 includes a wave shaping circuit 101, a frequency multiplication circuit 102, a frequency division circuit 102a, a sampling phase adjustment circuit 100, a frequency division circuit 102b, an input is amplifier 103, an analog-to-digital converter (A/D) 104, a decimation filter 105, a detection signal generator 106, a multiplier 107, and a digital filter 108.

The wave shaping circuit 101 converts the drive signal Sdrv to a square wave and outputs the resultant clock as a reference clock CKref. The wave shaping circuit 101 includes a comparator or an inverter, for example. The frequency of the reference clock CKref is substantially the same as the frequency of the drive signal Sdrv (i.e., the frequency of the sensor signal S10). The frequency multiplication circuit 102 multiplies the reference clock CKref from the wave shaping circuit 101 to generate a multiplied clock CKx having a frequency higher than that of the reference clock CKref. The frequency multiplication circuit 102 includes a phase locked loop (PLL), for example. The frequency division circuit 102a divides the frequency of the multiplied clock CKx from the frequency multiplication circuit 102 to generate an operation clock CKa (sampling clock) having a frequency identical to a predetermined sampling frequency (sampling frequency required for the analog-to-digital converter 104). That is, the multiplied clock CKx has a frequency higher than the sampling frequency. The frequency division circuit 102b divides the frequency of the operation clock CKa from the frequency division circuit 102a to generate an operation clock CKb having a frequency lower than that of the operation clock CKa.

The sampling phase adjustment circuit 100 includes a shift register 100R and a selector 100S. The shift register 100R shifts the operation clock CKa from the frequency division circuit 102a sequentially in synchronization with the multiplied clock CKx from the frequency multiplication circuit 102, to generate n (n is an integer equal to or more than 2) delayed clocks CC1, CC2, ..., CCn whose phases are shifted from each other by a predetermined amount. The shift register 100R includes a plurality of cascaded flip-flops, for example. The selector 100S selects one of the delayed clocks CC1, CC2, ..., CCn according to a set value SET set under external control, and outputs the selected delayed is clock as a sampling clock CKsp (phase-adjusted sampling clock). The set value SET is a value for setting the delay time in the sampling phase adjustment circuit 100, indicating the number of pulses of the multiplied clock CKx. For example, when the set value SET is set at "3," the selector 100S selects the third delayed clock CC3. Hence, the delay time in the sampling phase adjustment circuit 100 is set at the time corresponding to three pulses of the multiplied clock CKx.

Figure 3:
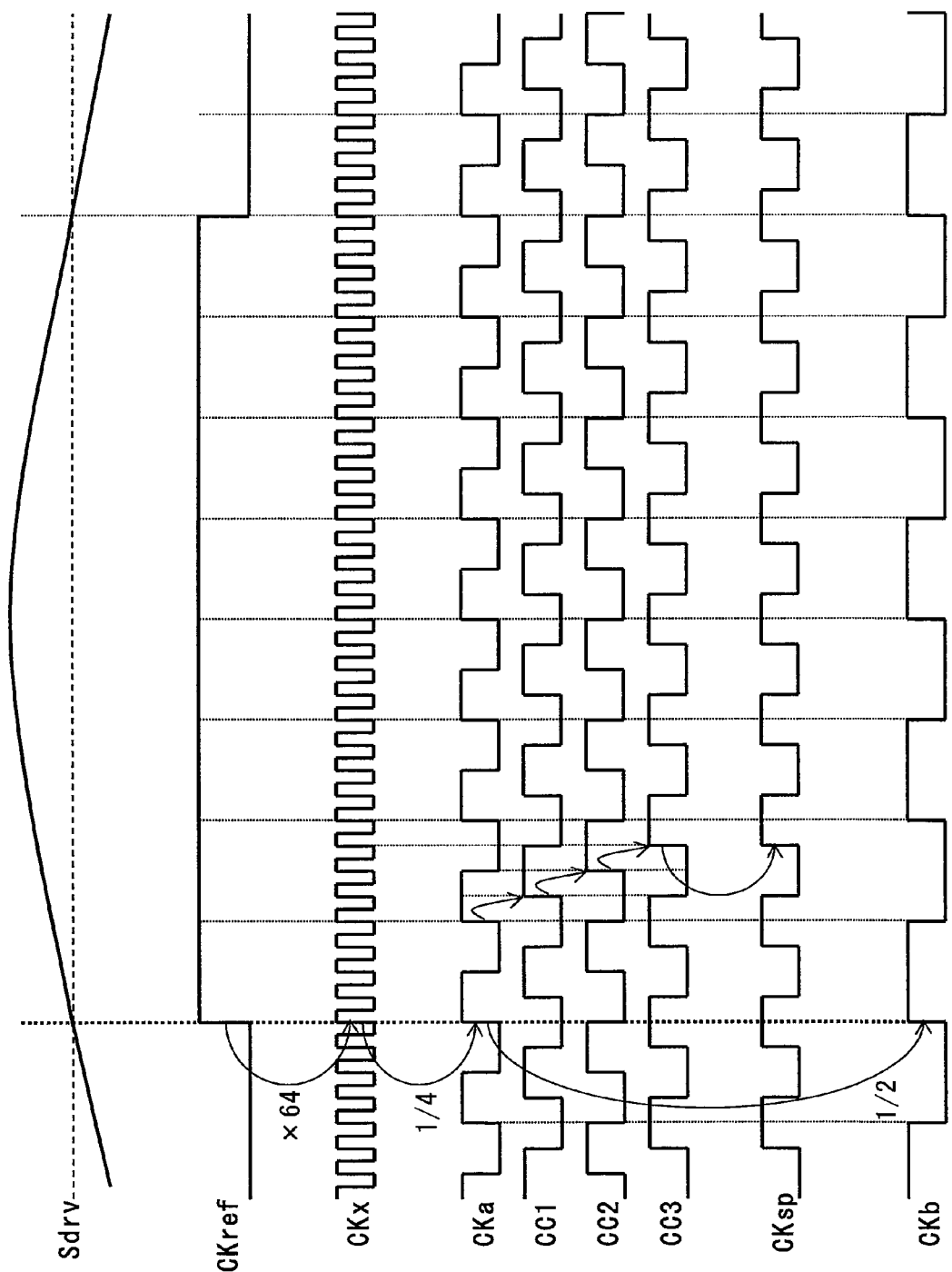
FIG. 3 is a timing chart illustrating the processing by a sampling phase adjustment circuit shown in FIG. 1.

For example, as shown in FIG. 3, the reference clock CKref is multiplied (by 64) to generate the multiplied clock CKx, which is then frequency-divided (by 4) to generate the operation clock CKa, which is in turn frequency-divided (by 2) to generate the operation clock CKb. The sampling phase adjustment circuit 100 outputs one of the plurality of delayed clocks (outputs the delayed clock CC3 out of three delayed clocks CC1, CC2, and CC3 in FIG. 3) as the sampling clock CKsp.

The input amplifier 103 converts the sensor signal S10 received from the physical quantity sensor 10 to a voltage and outputs the resultant signal as an analog sensor signal Ssnc. The analog-to-digital converter 104 samples the analog sensor signal Ssnc in synchronization with the sampling clock CKsp from the sampling phase adjustment circuit 100 and converts sampled analog values (amplitude values) to digital values. Hence, the analog sensor signal Ssnc is converted to a digital sensor signal Dsnc that contains a plurality of digital values. The decimation filter 105, operating in synchronization with the operation clock CKa from the frequency division circuit 102a, executes decimation processing (conversion of the sampling frequency, decimation of digital values, etc.) for the digital sensor signal Dsnc from the analog-to-digital converter 104, to convert the digital sensor signal Dsnc corresponding to the sampling clock CKsp (operation clock CKa) to a digital sensor signal Ddc corresponding to the operation clock CKb.

The detection signal generator 106, operating in synchronization with the operation clock CKb from the frequency division circuit 102b, generates a digital detection signal Ddet corresponding to a sine wave signal in response to a transition edge (a rising edge in the illustrated example) of the reference clock CKref from the wave shaping circuit 101. The digital detection signal Ddet contains a plurality of sine wave data units. The sine wave data units respectively correspond to a plurality of analog values (amplitude values) obtained by sampling a sine wave signal having a predetermined frequency (e.g., the drive signal Sdrv) in synchronization with a predetermined clock (e.g., the operation clock CKa) (see FIG. 4B). For example, the sine wave data units indicate ideal amplitude values expressed by a sine function.

The multiplier 107 multiplies the digital sensor signal Ddc from the decimation filter 105 by the digital detection signal Ddet from the detection signal generator 106. With this multiplication, a physical quantity signal (signal corresponding to the physical quantity sensed by the physical quantity sensor 10) is detected. The digital filter 108, operating in synchronization with the operation clock CKb, allows only a low-frequency component of the physical quantity signal detected by the multiplier 107 to pass therethrough as a digital detected signal Dphy for noise removal and the like.

[Detection Signal Generator]

Figure 4A:
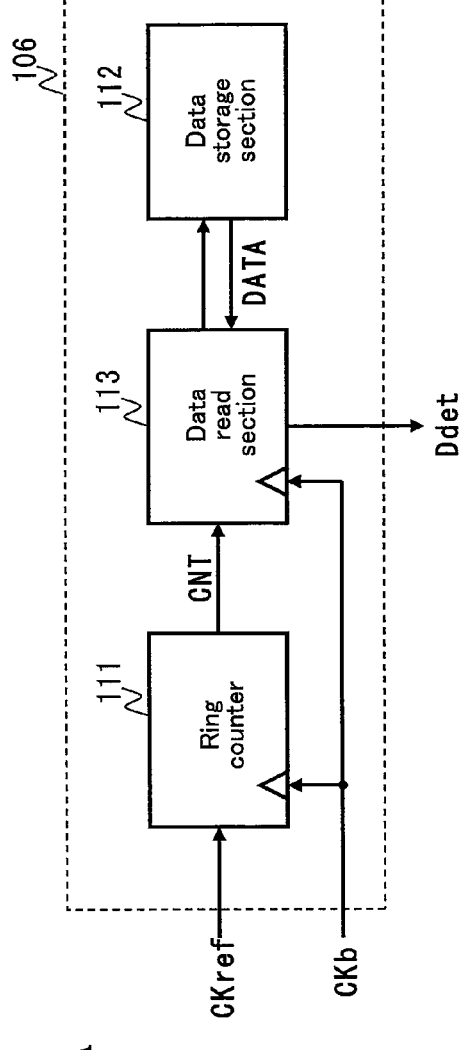
FIG. 4A is a view showing an example configuration of a detection signal generator shown in FIG. 1.
Figure 4B:
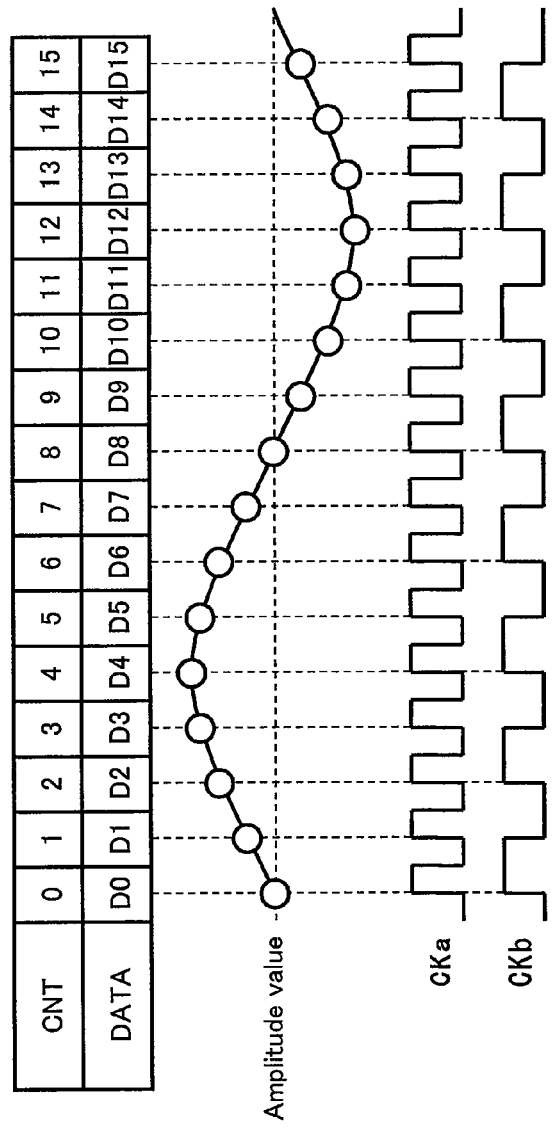
FIG. 4B is a view showing an example correspondence between the count value and the sine wave data in the detection signal generator of FIG. 4A.

As shown in FIG. 4A, the detection signal generator 106 includes a ring counter 111, a data storage section 112, and a data read section 113. The ring counter 111 and the data read section 113 operate in synchronization with the operation clock CKb. The ring counter 111 starts incrementing the count value CNT in response to a transition edge of the reference clock CKref, and resets the count value CNT to "0" once the count value CNT reaches a predetermined maximum value. The data storage section 112 stores a plurality of units of sine wave data DATA on which the digital detection signal Ddet is based. The data read section 113 reads the sine wave data DATA corresponding to the count value CNT of the ring counter 111 based on the preset correspondence between the count value CNT and the sine wave data DATA (FIG. 4B), and outputs the read sine wave data. In this way, with sine wave data units D0, D1, D2, ..., D15 being outputted in rotation, the digital detection signal Ddet corresponding to the sine wave signal is generated.

[Operation]

Figure 5:
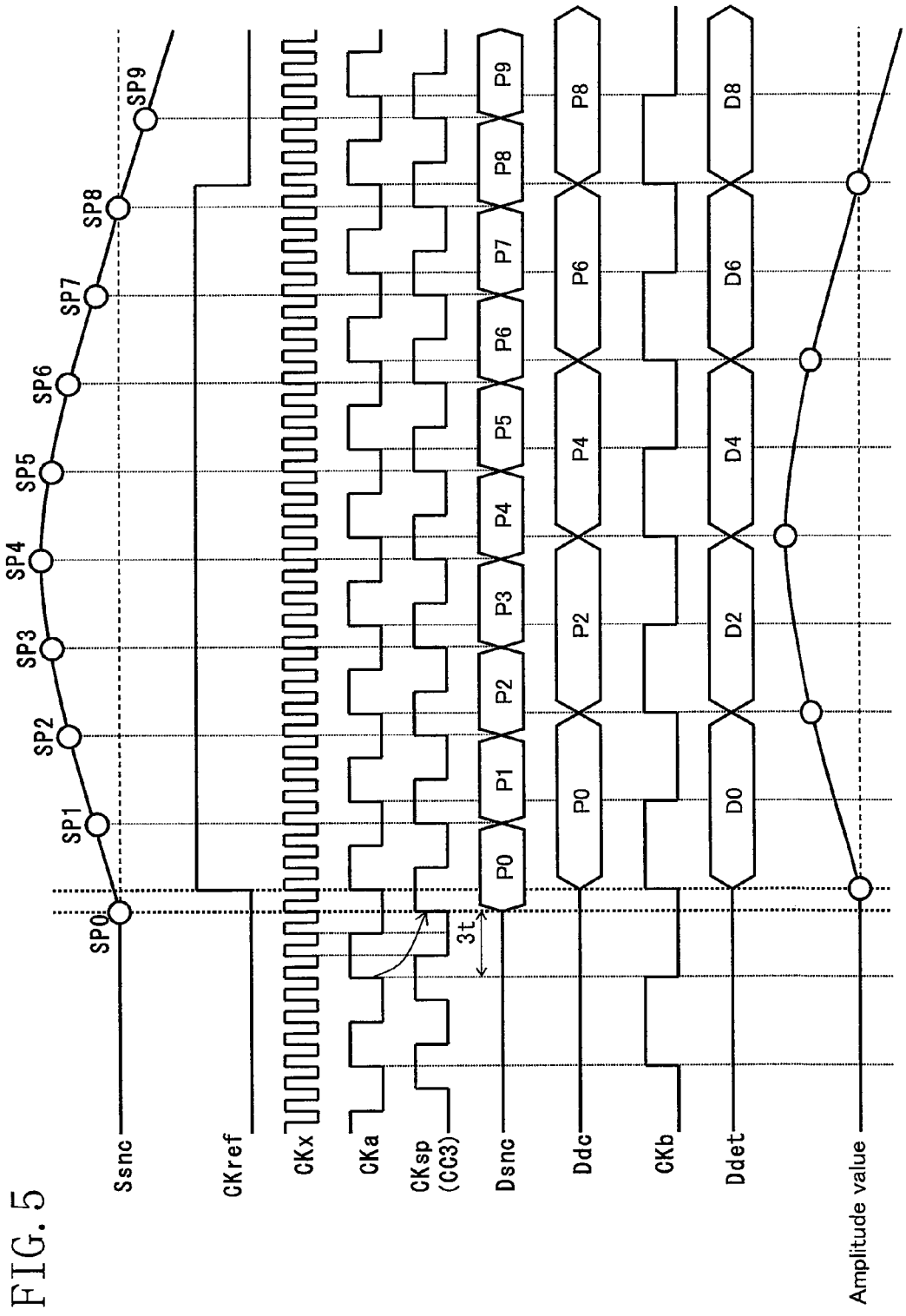
FIG. 5 is a timing chart illustrating the operation of a physical quantity detection circuit shown in FIG. 1.

Next, the operation of the physical quantity detection circuit 12 shown in FIG. 1 will be described with reference to FIG. 5. Assume in this embodiment that the period of the operation clock CKx is "t" and that the phase of the analog sensor signal Ssnc leads the phase of the reference clock CKref by "t." Assume also that the decimation filter 105 decimates the digital sensor signal Dsnc, eliminating every other digital value, to allow the digital sensor signal Dsnc to correspond to the frequency of the operation clock CKb (½ of the frequency of the operation clock CKa).

Transition edges of the operation clock CKa (pre-phase-adjusted sampling clock CKsp) do not agree with desired sampling points SP0, SP1, SP2, ... of the analog sensor signal Ssnc (e.g., points corresponding to the sine wave data units D0, D1, D2, ... ). At this time, when the set value SET is set at "3," the selector 100S selects the third delayed clock CC3 as the sampling clock CKsp. This enables the transition edges of the sampling clock CKsp to agree with the desired sampling points SP0, SP1, SP2, .... The analog-to-digital converter 104 converts the analog sensor signal Ssnc to digital values P0, P1, P2, P3, P4, ... in synchronization with the sampling clock CKsp. The decimation filter 105 decimates the digital sensor signal Dsnc, eliminating the digital values P1, P3, . . . , and outputs the resultant signal as the digital sensor signal Sdc. Meanwhile, the detection signal generator 106 starts outputting sine wave data units D0, D2, . . . synchronizing with the operation clock CKb in response to a transition edge of the reference clock CKref. The multiplier 107 multiplies the digital values P0, P2, . . . from the decimation filter 105 by the sine wave data units D0, D2, . . . from the detection signal generator 106, respectively.

As described above, by adjusting the phase of the sampling clock CKsp, the sampling points (positions of transition edges of the sampling clock CKsp) can be shifted, and as a result, the phase of the digital sensor signal Dsnc can be changed. In this way, the precision of the phase adjustment of the digital sensor signal Dsnc can be improved without increasing the sampling frequency. Also, since the positions of transition edges of the sampling clock CKsp can be made to agree with (or approximated to) the desired sampling points SP0, SP1, SP2, . . . , the precision of the analog-to-digital conversion can be improved.

Also, the phase of the sampling clock CKsp can be set using the period of the multiplied clock CKx as the unit, and as the frequency of the multiplied clock CKx is higher, the phase of the sampling clock CKsp can be set more precisely. Hence, the phase of the digital sensor signal Dsnc can be adjusted more precisely than conventionally done.

The frequency division circuit 102b may generate the operation clock CKb by dividing the frequency of the sampling clock CKsp from the sampling phase adjustment circuit 100.

Alteration of Embodiment 1

Figure 6:
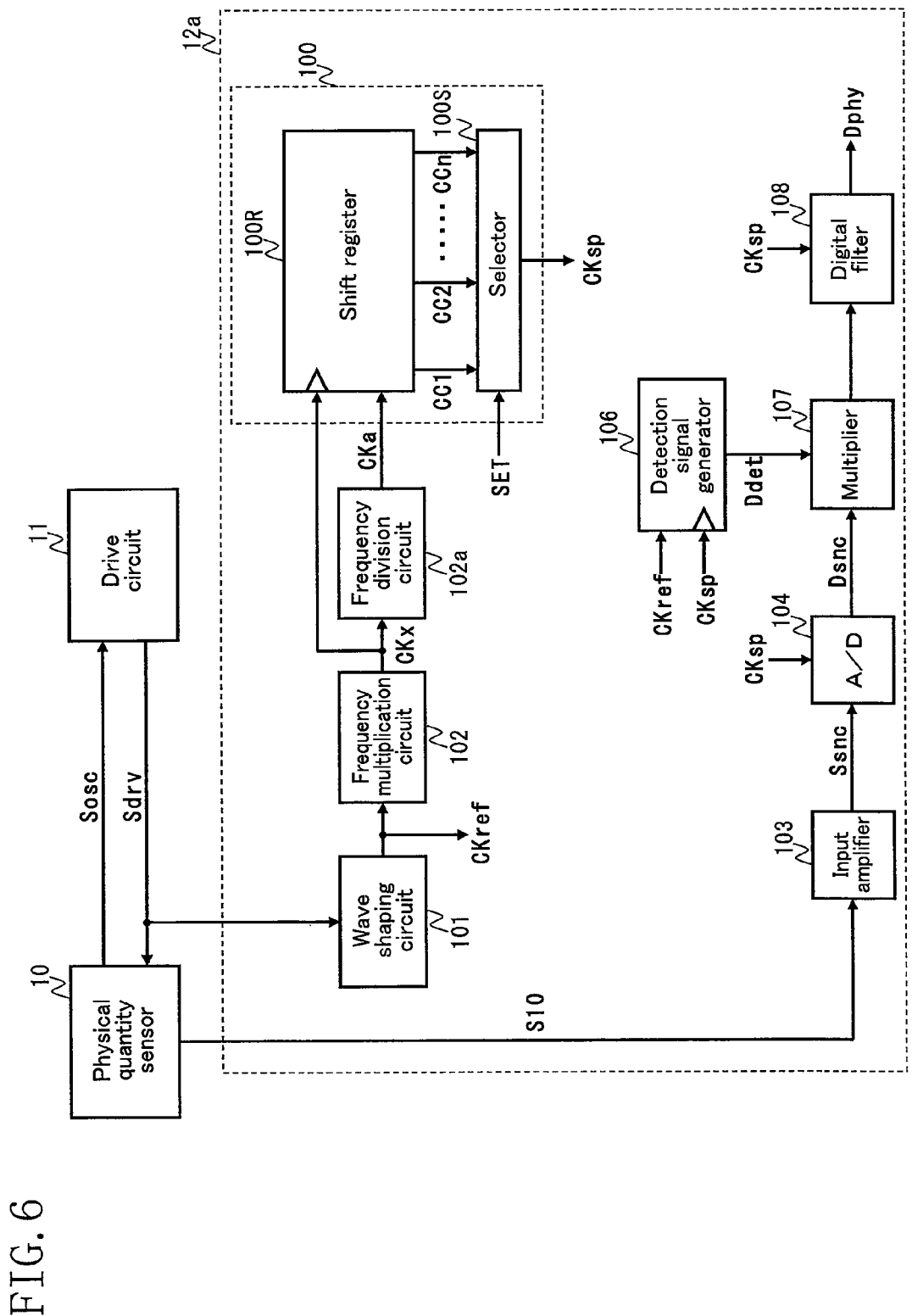
FIG. 6 is a view showing an alteration of the physical quantity detection circuit shown in FIG. 1.
Figure 7:
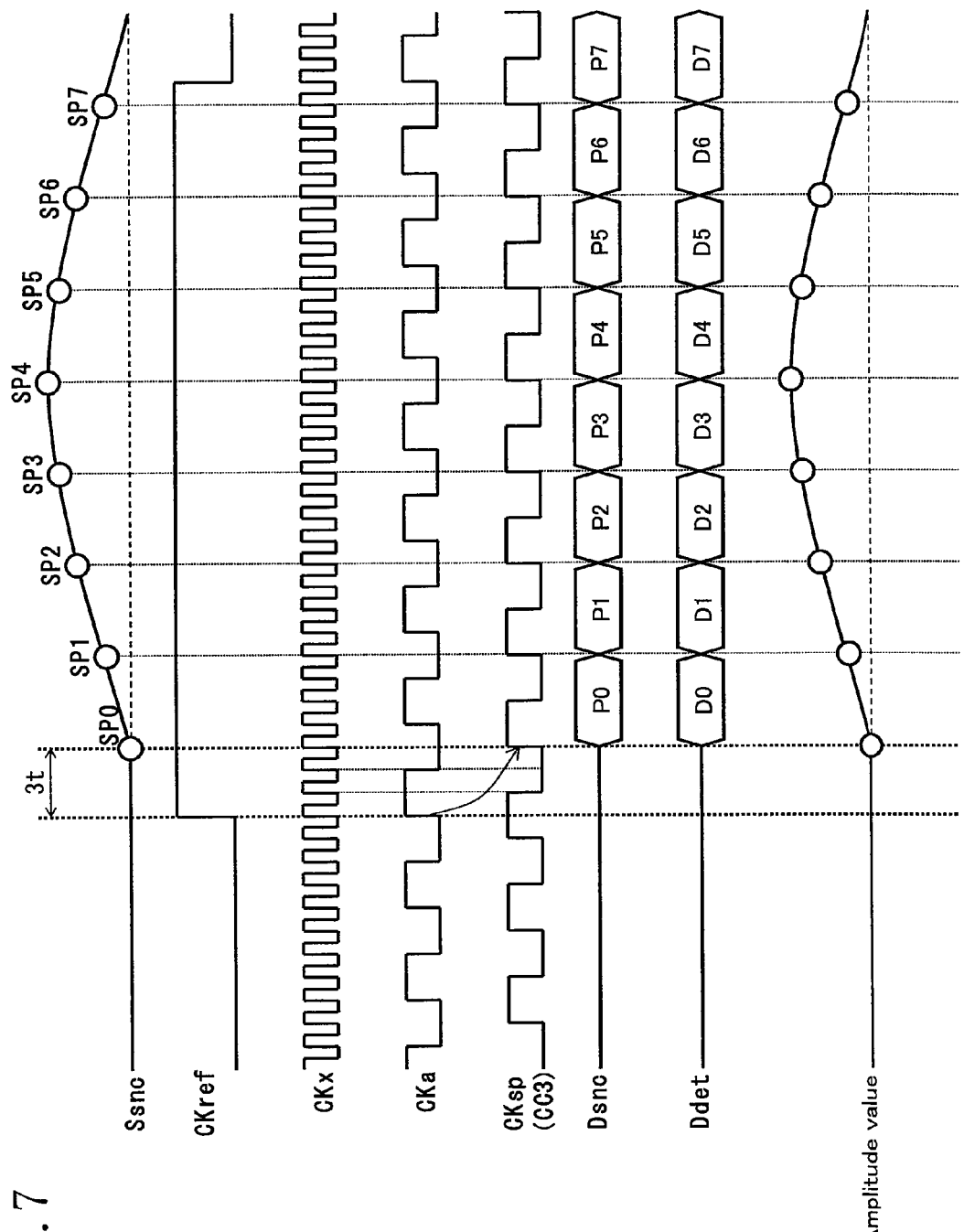
FIG. 7 is a timing chart illustrating the operation of the physical quantity detection circuit shown in FIG. 6.

As shown in FIG. 6, the detection signal generator 106 and the digital filter 108 may operate in synchronization with the sampling clock CKsp as does the analog-to-digital converter 104. A physical quantity detection circuit 12a shown in FIG. 6 includes neither the frequency division circuit 102b nor the decimation filter 105 shown in FIG. 1. As shown in FIG. 7, the detection signal generator 106 starts outputting the sine wave data units D0, D1, D2, . . . synchronizing with the sampling clock CKsp in response to a transition of the reference clock CKref. The multiplier 107 multiplies the digital values P0, P1, P2, . . . from the analog-to-digital converter 104 by the sine wave data units D0, D1, D2, . . . from the detection signal generator 106, respectively. In this case of using the sampling clock CKsp as the operation clock for the physical quantity detection circuit 12a, also, effects similar to those in the case of FIG. 1 can be obtained.

Embodiment 2

Figure 8:
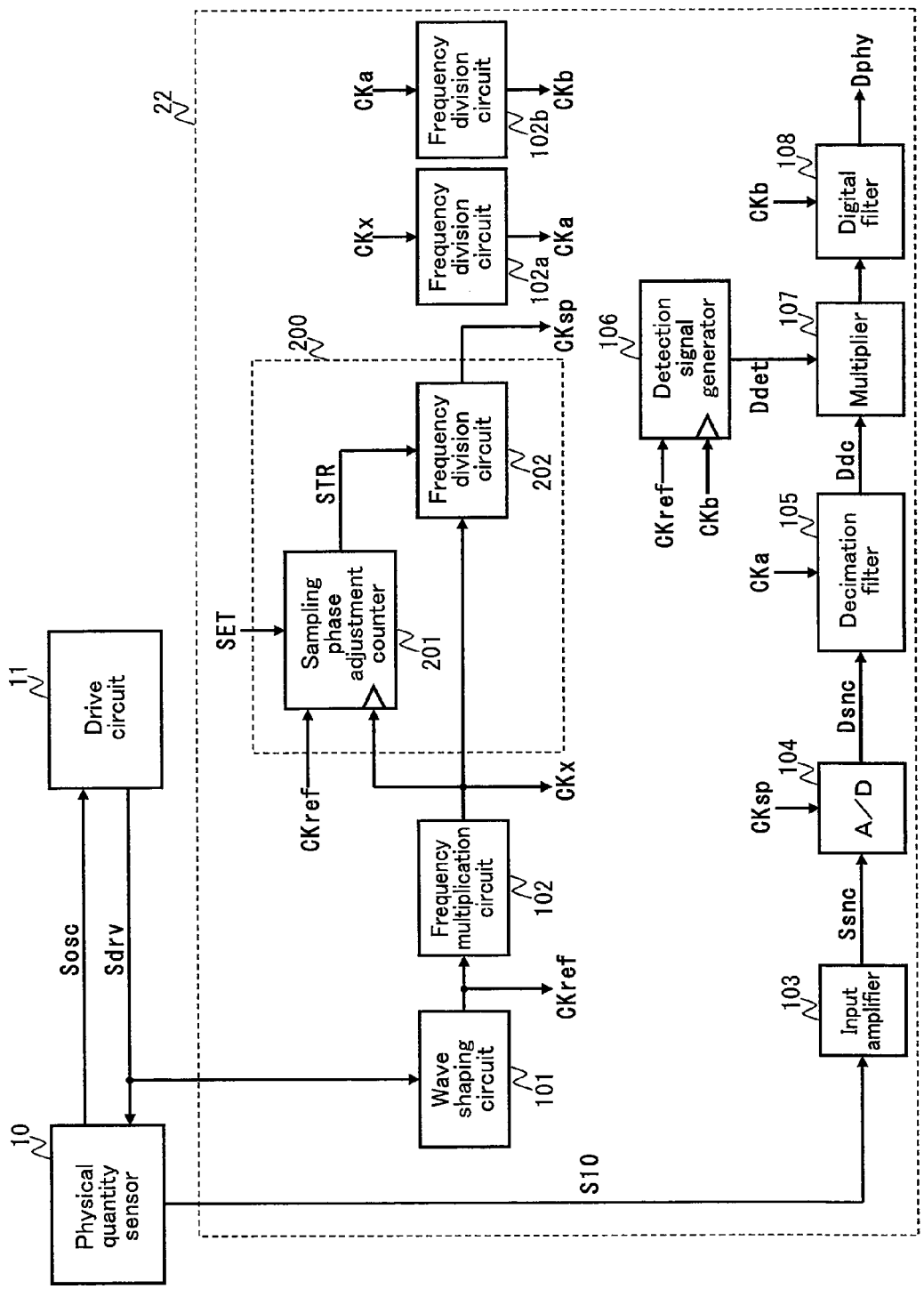
FIG. 8 is a view showing an example configuration of a physical quantity sensor device of Embodiment 2.

FIG. 8 shows an example configuration of a physical quantity sensor device of Embodiment 2. This physical quantity sensor device includes a physical quantity detection circuit 22 in place of the physical quantity detection circuit 12 shown in FIG. 1. The physical quantity detection circuit 22 includes a sampling phase adjustment circuit 200 in place of the sampling phase adjustment circuit 100 shown in FIG. 1. The other configuration is similar to that in FIG. 1.

The sampling phase adjustment circuit 200 includes a sampling phase adjustment counter 201 and a frequency division circuit 202 (clock generation circuit). The sampling phase adjustment counter 201 starts counting the number of generated pulses of the amplified clock CKx in response to a transition edge of the reference clock CKref, and outputs a timing signal STR once the number of generated pulses reaches a predetermined value SET set under external control. The frequency division circuit 202 starts frequency division processing (e.g., resets the output to its initial state) in response to a transition edge of the timing signal STR from the sampling phase adjustment counter 201. The frequency division circuit 202 then divides the frequency of the multiplied clock CKx to generate a sampling clock CKsp having a predetermined sampling frequency.

[Operation]

Figure 9:
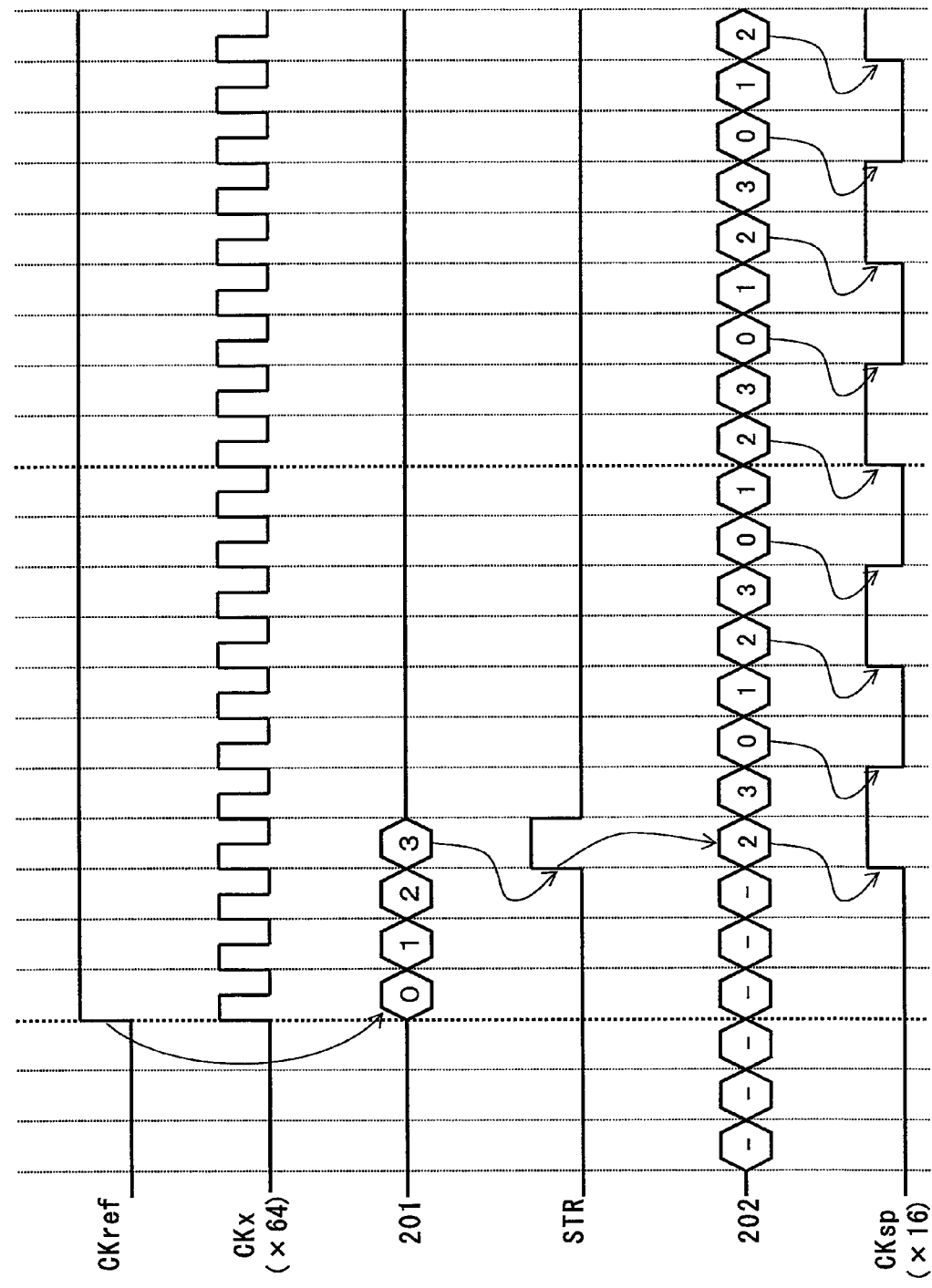
FIG. 9 is a timing chart illustrating the processing by a sampling phase adjustment circuit shown in FIG. 8.

Next, the processing by the sampling phase adjustment circuit 200 shown in FIG. 8 will be described with reference to FIG. 9. Assume in this embodiment that for dividing the frequency of the operation clock CKx by 4, the frequency division circuit 202 includes a 2-bit counter and supplies part of the output of the 2-bit counter corresponding to the most significant bit (MSB) as the sampling clock CKsp.

The sampling phase adjustment counter 201 starts counting the number of generated pulses of the multiplied clock CKx in response to a transition edge of the reference clock CKref. At this time, when the set value SET is set at "3," the sampling phase adjustment counter 201 outputs the timing signal STR once the count value reaches "3." The frequency division circuit 202 starts counting from the preset initial value (2 in the illustrated example) in response to a transition edge of the timing signal STR from the sampling phase adjustment counter 201, and resets the count value to "0" once the count value reaches the maximum value (3 in the illustrated example). The MSB output of the frequency division circuit 202 is "1" when the count value of the frequency division circuit 202 is 2 or 3 and "0" when it is 0 or 1.

As described above, the phase of the sampling clock CKsp can be set using the period of the multiplied clock CKx as the unit, and as the frequency of the multiplied clock CKx is higher, the phase of the sampling clock CKsp can be set more precisely. Hence, the phase of the digital sensor signal Dsnc can be adjusted more precisely than conventionally done.

The frequency division circuit 202 may be replaced with a frequency multiplication circuit that starts multiplication processing in response to the timing signal STR from the sampling phase adjustment counter 201. Such a frequency multiplication circuit will multiply a clock having a predetermined frequency to generate the sampling clock CKsp.

Embodiment 3

Figure 10:
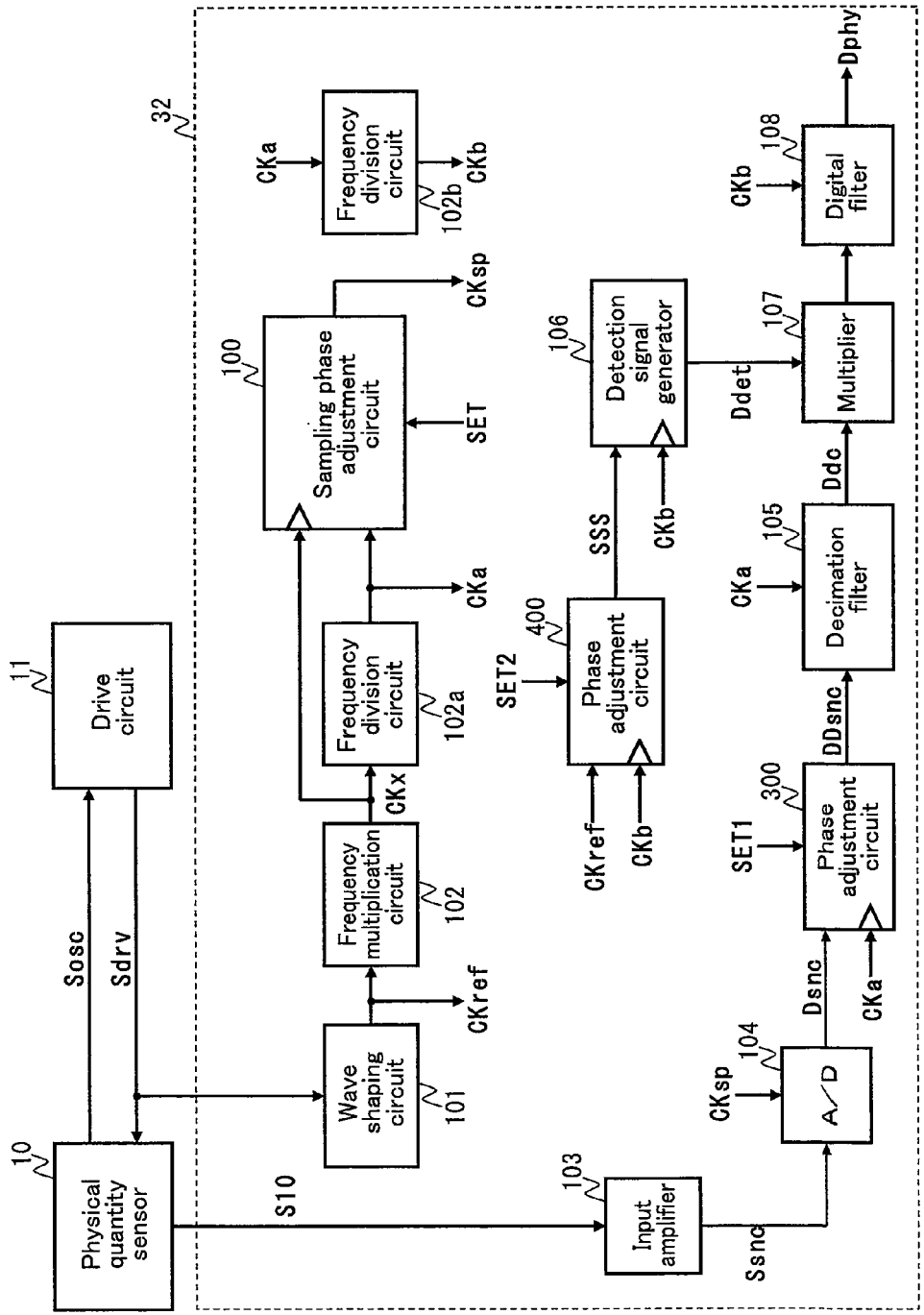
FIG. 10 is a view showing an example configuration of a physical quantity sensor device of Embodiment 3.

FIG. 10 shows an example configuration of a physical quantity sensor device of Embodiment 3. This physical quantity sensor device includes a physical quantity detection circuit 32 in place of the physical quantity detection circuit 12 shown in FIG. 1. The physical quantity detection circuit 32 includes a phase adjustment circuit 300 for adjusting the phase of the digital sensor signal Dsnc and a phase adjustment circuit 400 for adjusting the phase of the digital detection signal Ddet, in addition to the components shown in FIG. 1. The other configuration is similar to that in FIG. 1.

Figure 11:
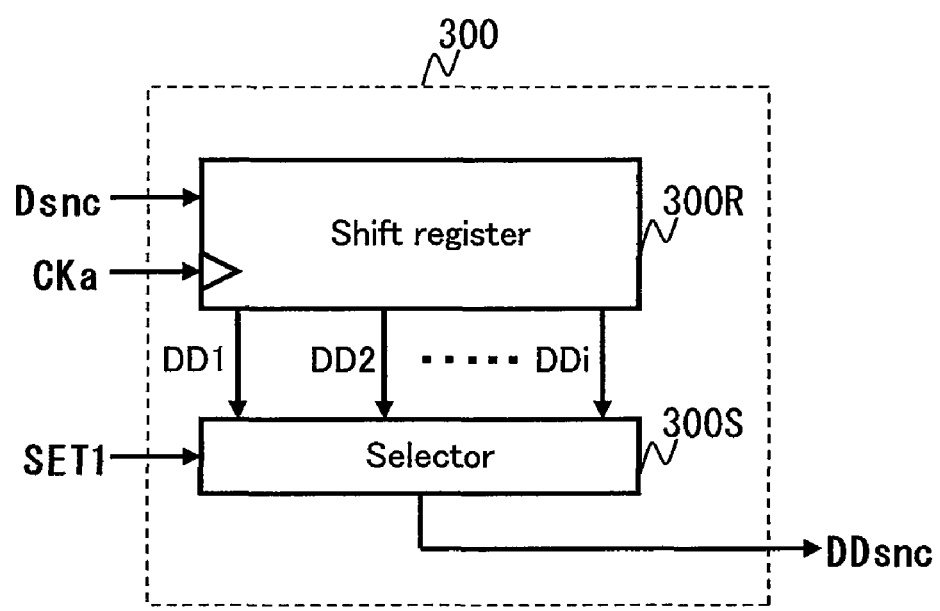
FIG. 11 is a view showing an example configuration of a phase adjustment circuit shown in FIG. 10.

As shown in FIG. 11, the phase adjustment circuit 300 includes a shift register 300R and a selector 300S. The shift register 300R shifts the digital sensor signal Dsnc sequentially in synchronization with the operation clock CKa from the frequency division circuit 102a, to generate i (i is an integer equal to or more than 2) delayed signals DD1, DD2, . . . , DDi whose phases are shifted from each other by a predetermined amount. The shift register 300R includes a plurality of cascaded flipflops, for example. The selector 300S selects one of the delayed signals DD1, DD2, . . . , DDi according to a set value SET1 set under external control, and outputs the selected delayed signal as a delayed digital sensor signal DDsnc. The set value SETT is a value for setting the delay time in the phase adjustment circuit 300, indicating the number of pulses of the operation clock CKa.

Figure 12B:
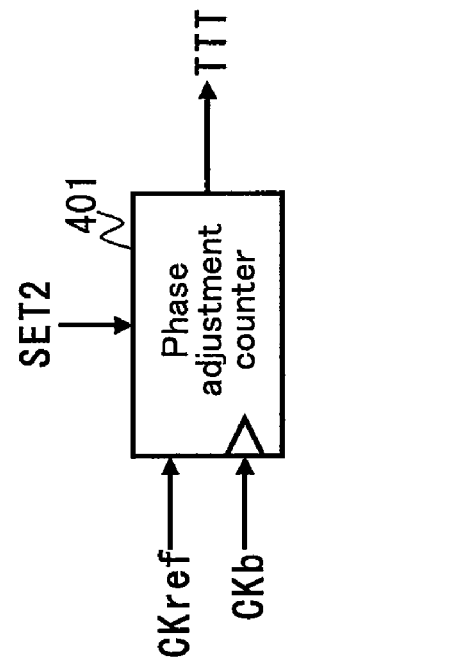
FIG. 12B is a view illustrating a phase adjustment counter.
Figure 12A:
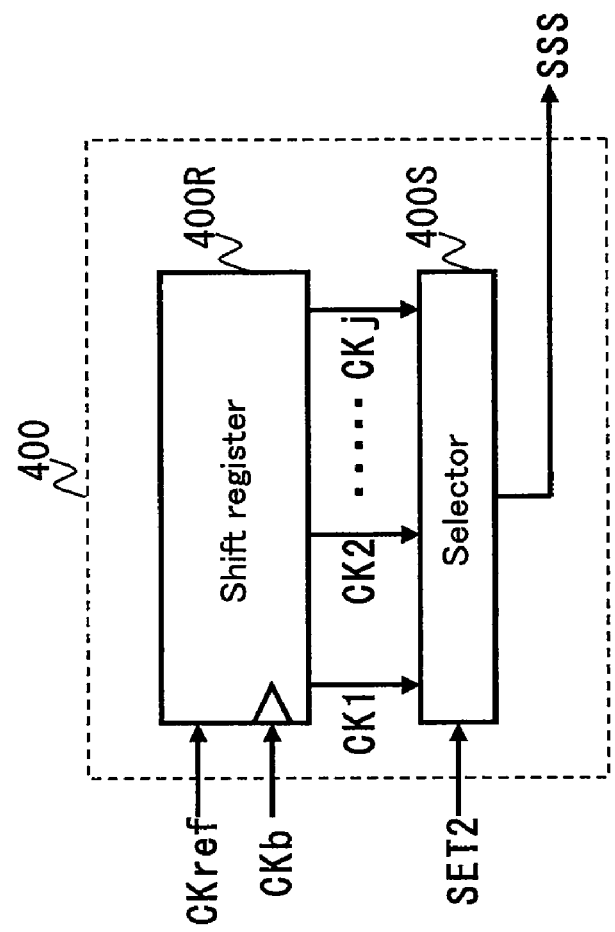
FIG. 12A is a view showing another example configuration of the phase adjustment circuit shown in FIG. 10.

As shown in FIG. 12A, the phase adjustment circuit 400 includes a shift register 400R and a selector 400S. The shift register 400R shifts the reference clock CKref sequentially in synchronization with the operation clock CKb from the frequency division circuit 102b, to generate j (j is an integer equal to or more than 2) delayed clocks CK1, CK2, ..., CKj whose phases are shifted from each other by a predetermined amount. The shift register 400R includes a plurality of cascaded flipflops, for example. The selector 400S selects one of the delayed clocks CK1, CK2, ..., CKj according to a set value SET2 set under external control, and outputs the selected delayed clock as a selected clock SSS. The set value SET2 is a value for setting the delay time in the phase adjustment circuit 400, indicating the number of pulses of the operation clock CKb. The phase adjustment circuit 400 shown in FIG. 10 may be replaced with a phase adjustment counter 401 shown in FIG. 12B. The phase adjustment counter 401, similar in configuration to the sampling phase adjustment counter 201 shown in FIG. 8, starts counting the number of generated pulses of the operation clock CKb from the frequency division circuit 102b in response to a transition edge of the reference clock CKref, and outputs a timing signal TTT once the number of generated pulses reaches the set value SET2. The detection signal generator 106 starts generation of the digital detection signal Ddet in response to a transition edge of the selected clock SSS from the phase adjustment circuit 400 (or the timing signal TTT from the phase adjustment counter 401).

[Operation]

Figure 13:
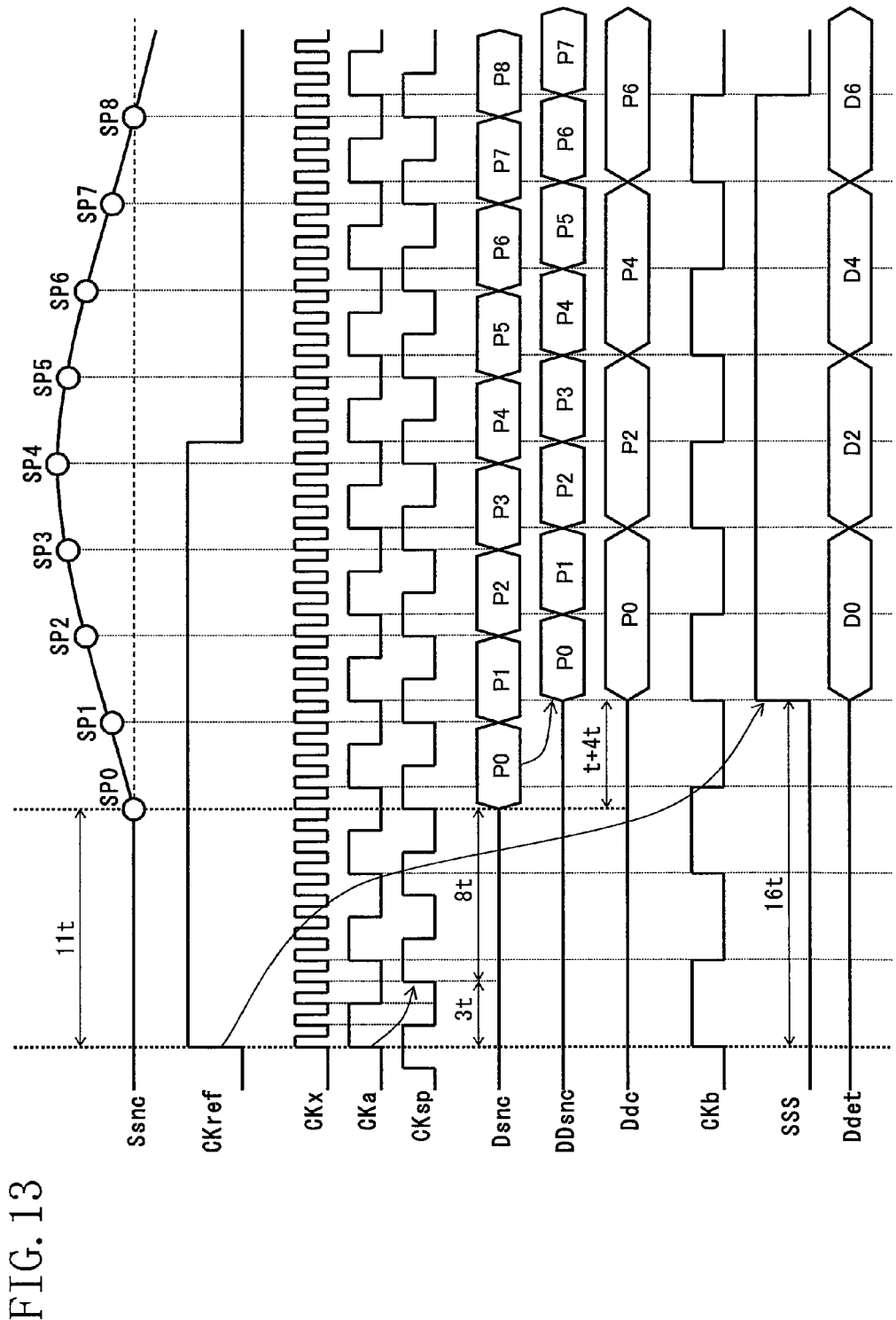
FIG. 13 is a timing chart illustrating the operation of a physical quantity detection circuit shown in FIG. 10.

Next, the operation of the physical quantity detection circuit 32 shown in FIG. 10 will be described with reference to FIG. 13. Assume in this embodiment that the period of the multiplied clock CKx is "t" and that the phase of the analog sensor signal Ssnc lags behind the phase of the reference clock CKref by "11t." Assume also that the frequency of the operation clock CKa (sampling clock CKsp) and the frequency of the operation clock CKb are respectively "¼" and "⅛" of the multiplied clock CKx.

When the set value SET in the sampling phase adjustment circuit 100 is set at "3," the sampling phase adjustment circuit 100 delays the operation clock CKa by the time "3t" corresponding to three pulses of the multiplied clock CKx, and outputs the resultant clock as the sampling clock CKsp. This enables the transition edges of the sampling clock CKsp to agree with the desired sampling points SP0, SP1, SP2, . . . .

When the set value SET1 in the phase adjustment circuit 300 is set at "1," the phase adjustment circuit 300 delays the digital sensor signal Dsnc by the time "4t" corresponding to one pulse of the operation clock CKa, and outputs the resultant signal as the delayed digital sensor signal DDsnc. Since the phase of the operation clock CKa is shifted by "t" from the phase of the sampling clock CKsp, the phase difference between the reference clock CKref and the delayed digital sensor signal DDsnc becomes "16t (=3t+8t+t+4t)." Also, the phase difference between the reference clock CKref and the digital sensor signal Ddc from the decimation filter 105 becomes "16t."

Meanwhile, when the set value SET2 in the phase adjustment circuit 400 is set at "2," the phase adjustment circuit 400 delays the reference clock CKref by the time "16t" corresponding to two pulses of the operation clock CKb, and outputs the resultant clock as the selected clock SSS. The detection signal generator 106 outputs the sine wave data units D0, D2, . . . in response to a transition edge of the selected clock SSS. Hence, the phase difference between the reference clock CKref and the digital detection signal Ddet becomes "16t." In this way, the phase of the digital sensor signal Dsnc and the phase of the digital detection signal Ddet can be made to agree with each other.

As described above, with the phase adjustment circuit 300, the phase of the digital sensor signal Dsnc can be set using the period of the operation clock CKa as the unit. Also, with the phase adjustment circuit 400 (or the phase adjustment counter 401), the phase of the digital detection signal Ddet can be set using the period of the operation clock CKb as the unit. In this way, the phase of the digital sensor signal Dsnc and the phase of the digital detection signal Ddet can be set precisely.

Also, since the operation clock CKb is lower in frequency than the operation clock CKa, the precision of the phase adjustment of the phase adjustment circuit 400 is lower than that of the phase adjustment circuit 300. With this sharing of the phase adjustment processing between the phase adjustment circuits 300 and 400 that are different in phase adjustment precision, the circuit scale and power consumption required for the phase adjustment processing can be reduced. For example, for setting of a maximum delay time of "16t" where "t" is the period of the operation clock CKa, a total of 16 flipflops must be provided when only the phase adjustment circuit 400 is used. In the case of FIG. 10, however, it is only necessary to provide four flipflops each for the phase adjustment circuits 300 and 400.

The phase adjustment circuits 300 and 400 may operate in synchronization with other operation clocks (clocks having a frequency different from the operation clock CKa) having a frequency higher than the frequency of the reference clock CKref.

[Alteration of Detection Signal Generator]

Figures 14A, 14B:
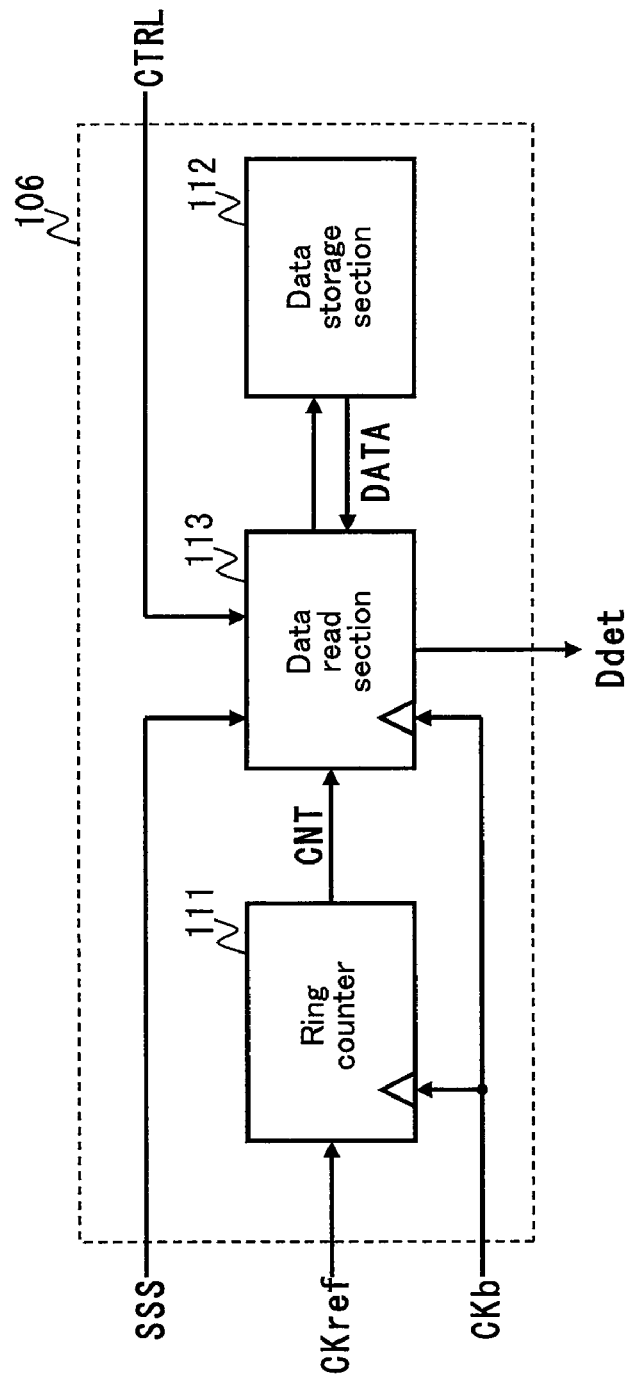
FIG. 14A is a view showing an example configuration of a detection signal generator shown in FIG. 10.
FIG. 14B is a view showing an example correspondence between the count value and the sine wave data in the detection signal generator of FIG. 14A.

As shown in FIG. 14A, the ring counter 111 may start incrementing the count value CNT in response to a transition edge of the reference clock CKref. In this case, the correspondence between the counter value CNT and the sine wave data DATA can be set under external control CTRL. The data read section 113 starts reading the sine wave data DATA corresponding to the current value CNT in response to a transition edge of the selected clock SSS. For example, when the set value SET in the phase adjustment circuit 300 is set at "3," the correspondence between the count value CNT and the sine wave data DATA is set as shown in FIG. 14B. With this setting, the detection signal generator 106 is allowed to output the sine wave data units D0, D1, D2, . . . in rotation in response to a transition edge of the selected clock SSS.

Alteration of Embodiment 3

Figure 15:
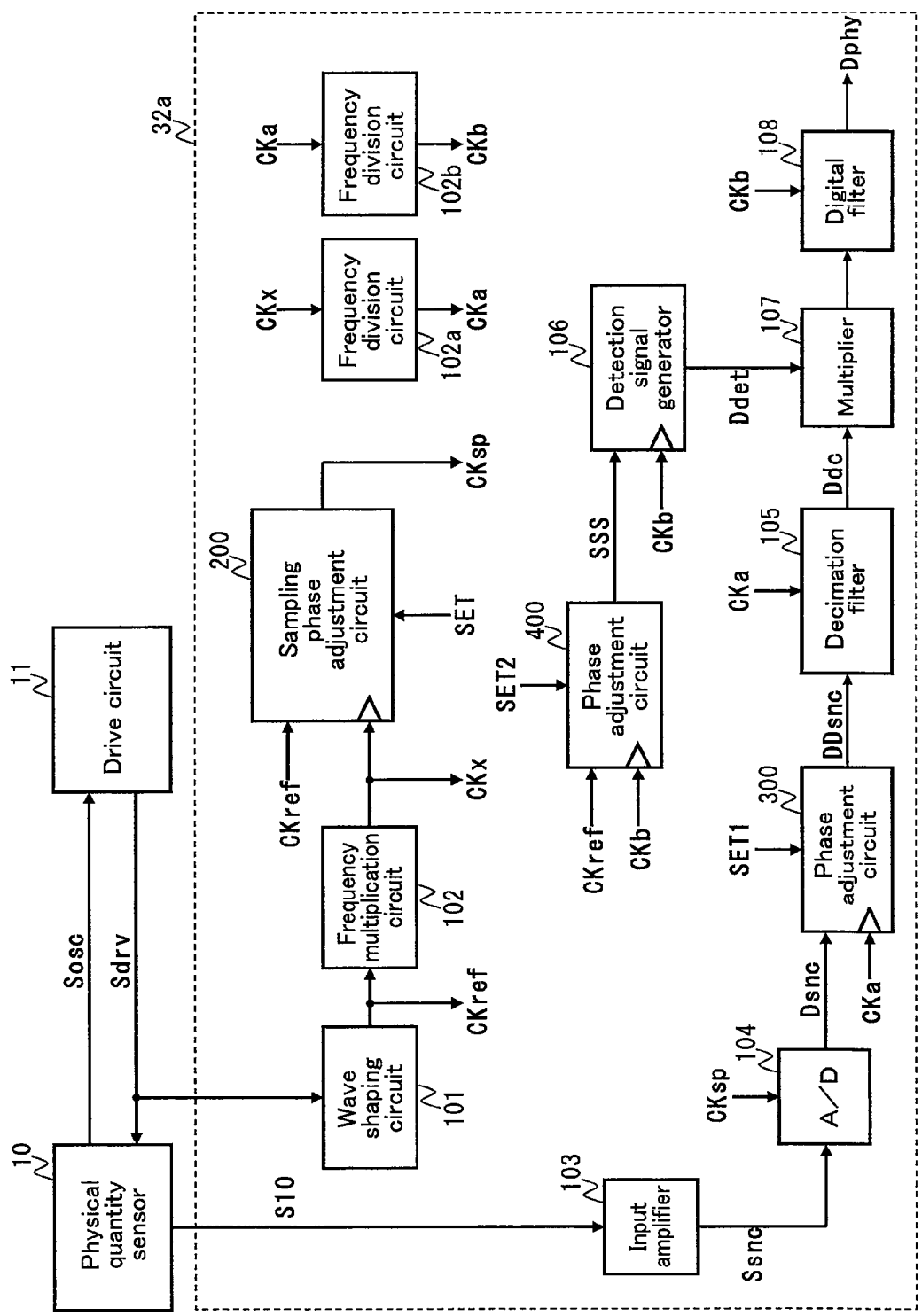
FIG. 15 is a view showing an alteration of the physical quantity detection circuit shown in FIG. 10.

The sampling phase adjustment circuit 100 shown in FIG. 10 may be replaced with the sampling phase adjustment circuit 200 shown in FIG. 8 as in a physical quantity detection circuit 32a shown in FIG. 15. In this case, also, effects similar to those in the case of FIG. 10 can be obtained.

Other Embodiments

Figure 16:
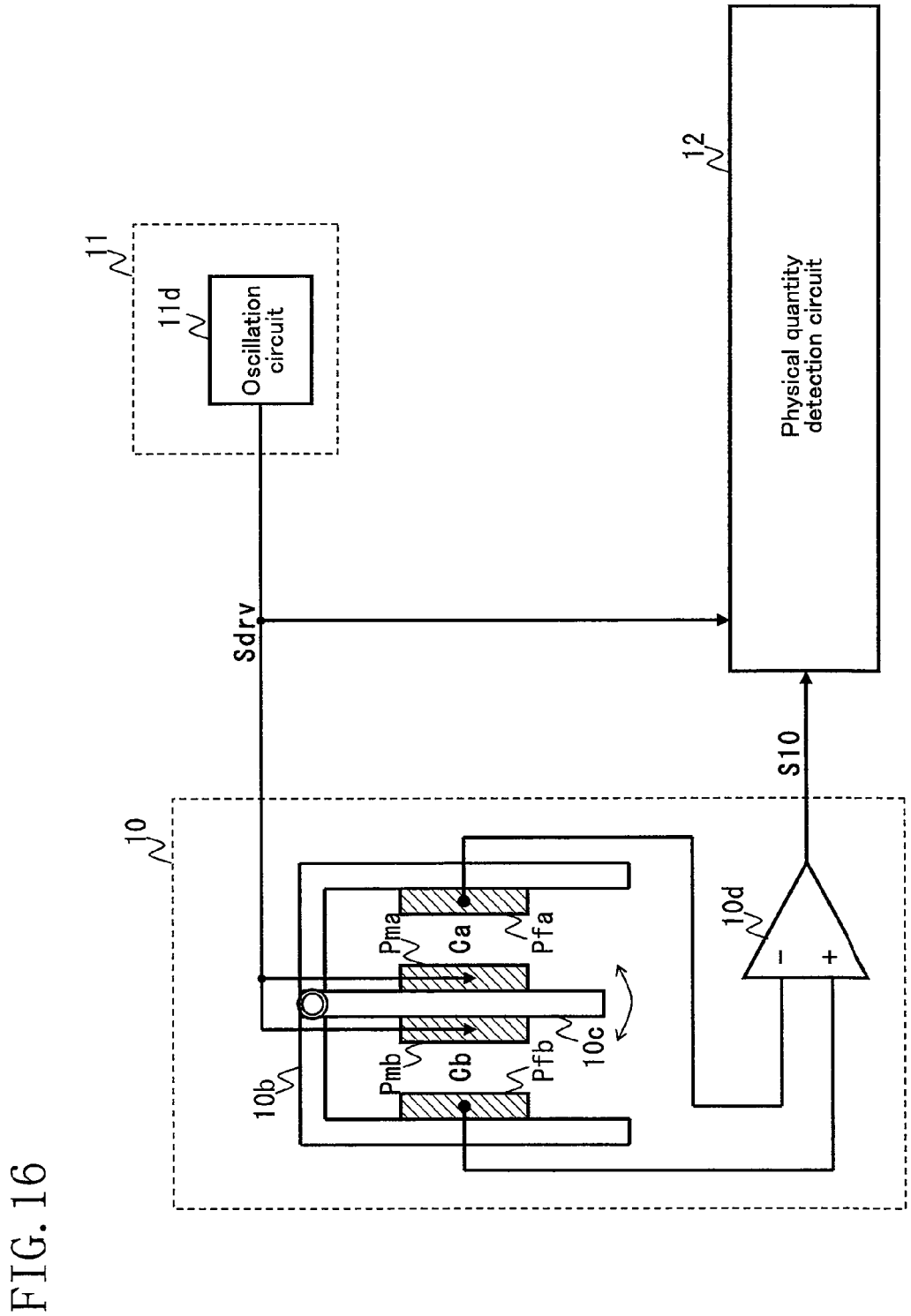
FIG. 16 is a view illustrating an alteration of the physical quantity sensor.
Figure 17:
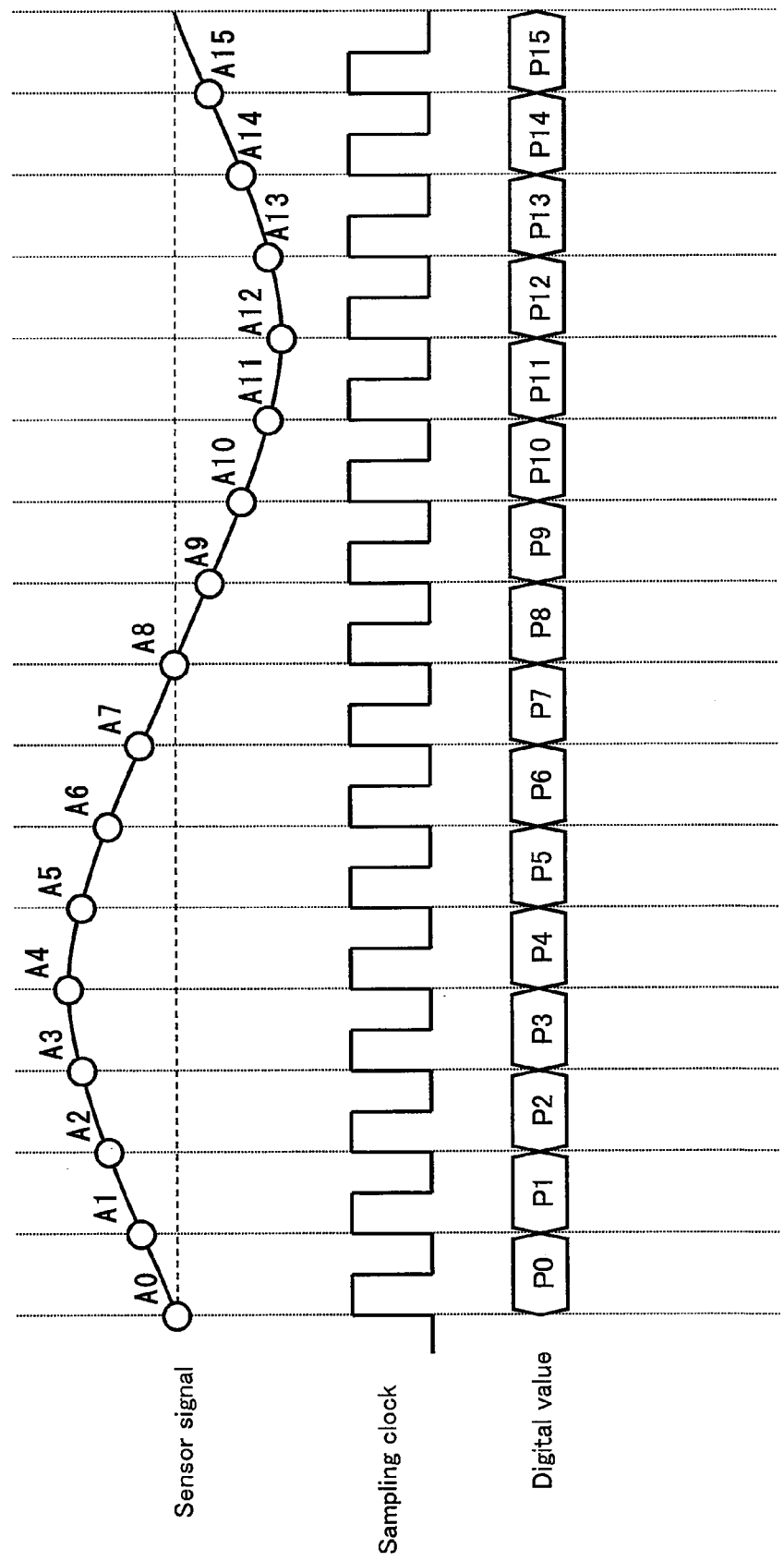
FIG. 17 is a view illustrating the processing by an analog-to-digital converter circuit.

The physical quantity sensor 10 in the above embodiments does not have to be of the tuning fork type, but may be of a circular cylinder type, a regular triangular prism type, a square prism type, or a ring type, or may be of another shape. Otherwise, as shown in FIG. 16, the physical quantity sensor 10 may be a capacitive acceleration sensor. In this case, the physical quantity sensor 10 includes a fixed portion 10b, a movable portion 10c, movable electrodes Pma and Pmb, detection electrodes Pfa and Pfb, and a differential amplifier 10d. The movable portion 10c is connected to the fixed portion 10b so that it can be displaced according to acceleration. The movable electrodes Pma and Pmb are placed on the movable portion 10c. The detection electrode Pfa and Pfb are placed on the fixed portion 10b so as to face the movable electrodes Pma and Pmb, respectively. That is, the movable electrode Pma and the detection electrode Pfa constitute a capacitor Ca, and the movable electrode Pmb and the detection electrode Pfb constitute a capacitor Cb. A drive signal Sdrv from an oscillation circuit 11d is supplied to the capacitors Ca and Cb. The differential amplifier 10d outputs a sensor signal S10 corresponding to the difference between the charge amounts generated in the detection electrodes Pfa and Pfb. Once acceleration occurs, one of the capacitances of the capacitors Ca and Cb increases while the other decreases, due to a displacement of the movable portion 10c. This causes a difference in charge amount between the detection electrodes Pfa and Pfb, and the sensor signal S10 corresponding to this difference is outputted.

In the above embodiments, the set values SET, SET1, and SET2 are described as changeable values. Alternatively, the set values SET, SET1, and SET2 may be fixed values.

The physical quantity detection circuits described above, capable of improving the precision of the phase adjustment while suppressing increase in sampling frequency, are suitable for physical quantity sensors (e.g., tuning fork type angular velocity sensors, capacitive acceleration sensors, etc.) used in mobile units, cellular phones, digital cameras, game machines, and the like.

It should be noted that the embodiments described above are essentially preferred illustrations, and by no means intended to restrict the scope of the present invention, applications thereof, or uses thereof.

What is claimed is:

1. A physical quantity detection circuit used for a physical quantity sensor that outputs a sensor signal according to a physical quantity given externally, the circuit comprising:
    a sampling phase adjustment circuit configured to adjust the phase of a sampling clock having a predetermined sampling frequency;
    an analog-to-digital converter circuit configured to convert the sensor signal to a digital sensor signal in synchronization with the sampling clock phase-adjusted by the sampling phase adjustment circuit; and
    a detection circuit configured to detect the physical quantity based on the digital sensor signal from the analog-to-digital converter circuit,
    wherein the detection circuit includes
        a detection signal generator circuit configured to generate a digital detection signal corresponding to a sine wave signal in response to a transition edge of a reference clock having a frequency corresponding to the frequency of the sensor signal, and
        a multiplier circuit configured to multiply the digital sensor signal from the analog-to-digital converter circuit by the digital detection signal from the detection signal generator circuit, to detect a physical quantity signal corresponding to the physical quantity, and
    wherein the sampling phase adjustment circuit is configured to operate in synchronization with a multiplied clock having a frequency higher than the sampling frequency, to delay the sampling clock by a predetermined number of pulses of the multiplied clock.

2. The physical quantity detection circuit of claim 1, wherein the sampling phase adjustment circuit includes
    a shift register configured to shift the sampling clock sequentially in synchronization with the multiplied clock to generate a plurality of delayed clocks; and
    a selector configured to select one of the plurality of delayed clocks generated by the shift register, and
    the analog-to-digital converter circuit performs analog-to-digital conversion in synchronization with the delayed clock selected by the selector.

3. The physical quantity detection circuit of claim 1, wherein the sampling phase adjustment circuit includes
    a sampling phase adjustment counter configured to count the number of generated pulses of the multiplied clock to generate a timing signal once the number of generated pulses reaches a predetermined value, and
    a clock generation circuit configured to generate the sampling clock in response to a transition edge of the timing signal from the sampling phase adjustment counter.

4. The physical quantity detection circuit of claim 3, wherein the clock generation circuit is a frequency division circuit configured to generate the sampling clock by dividing the frequency of the multiplied clock in response to a transition edge of the timing signal from the sampling phase adjustment counter.

5. The physical quantity detection circuit of claim 1, further comprising a detection phase adjustment circuit configured to adjust the phase of the digital detection signal.

6. The physical quantity detection circuit of claim 5, wherein the detection phase adjustment circuit receives the reference clock and operates in synchronization with an operation clock having a frequency higher than the frequency of the reference clock, to delay a transition edge of the reference clock by a predetermined number of pulses of the operation clock, and
    the detection signal generator circuit generates the digital detection signal in response to a transition edge of the reference clock delayed by the detection phase adjustment circuit.

7. A physical quantity detection circuit used for a physical quantity sensor that outputs a sensor signal according to a physical quantity given externally, the circuit comprising:
    a sampling phase adjustment circuit configured to adjust the phase of a sampling clock having a predetermined sampling frequency;
    an analog-to-digital converter circuit configured to convert the sensor signal to a digital sensor signal in synchronization with the sampling clock phase-adjusted by the sampling phase adjustment circuit;
    a sensor phase adjustment circuit configured to adjust the phase of the digital sensor signal; and
    a detection circuit configured to detect the physical quantity based on the digital sensor signal phase-adjusted by the sensor phase adjustment circuit,
    wherein the sampling phase adjustment circuit is configured to operate in synchronization with a multiplied clock having a frequency higher than the sampling frequency, to delay the sampling clock by a predetermined number of pulses of the multiplied clock.

8. The physical quantity detection circuit of claim 7, wherein the sensor phase adjustment circuit receives the digital sensor signal from the analog-to-digital converter circuit and operates in synchronization with an operation clock having a frequency higher than the frequency of the sensor signal, to delay the digital sensor signal by a predetermined number of pulses of the operation clock.

9. The physical quantity detection circuit of claim 7, wherein the sampling phase adjustment circuit includes
   a shift register configured to shift the sampling clock sequentially in synchronization with the multiplied clock to generate a plurality of delayed clocks, and
   a selector configured to select one of the plurality of delayed clocks generated by the shift register, and
   the analog-to-digital converter circuit performs analog-to-digital conversion in synchronization with the delayed clock selected by the selector.

10. The physical quantity detection circuit of claim 7, wherein the sampling phase adjustment circuit includes
   a sampling phase adjustment counter configured to count the number of generated pulses of the multiplied clock to generate a timing signal once the number of generated pulses reaches a predetermined value, and
   a clock generation circuit configured to generate the sampling clock in response to a transition edge of the timing signal from the sampling phase adjustment counter.

11. The physical quantity detection circuit of claim 10, wherein the clock generation circuit is a frequency division circuit configured to generate the sampling clock by dividing the frequency of the multiplied clock in response to a transition edge of the timing signal from the sampling phase adjustment counter.

12. A physical quantity sensor device comprising:
   a physical quantity sensor configured to output a sensor signal according to a physical quantity given externally;
   a drive circuit configured to supply a drive signal having a predetermined frequency to the physical quantity sensor; and
   a physical quantity detection circuit,
   wherein the physical quantity detection circuit includes
      a sampling phase adjustment circuit configured to adjust the phase of a sampling clock having a predetermined sampling frequency,
      an analog-to-digital converter circuit configured to convert the sensor signal to a digital sensor signal in synchronization with the sampling clock phase-adjusted by the sampling phase adjustment circuit, and
      a detection circuit configured to detect the physical quantity based on the digital sensor signal from the analog-to-digital converter circuit,
   the sampling clock is a clock obtained by multiplying a reference clock having a frequency corresponding to the frequency of the drive signal, and
   the sampling phase adjustment circuit is configured to operate in synchronization with a multiplied clock having a frequency higher than the sampling frequency, to delay the sampling clock by a predetermined number of pulses of the multiplied clock.

\* \* \* \* \*